US006838980B2

(12) United States Patent
Gloger et al.

(10) Patent No.: US 6,838,980 B2
(45) Date of Patent: Jan. 4, 2005

(54) CAMERA-BASED PRECRASH DETECTION SYSTEM

(75) Inventors: Joachim Gloger, Bibertal (DE); Matthias Oberlaender, Ulm (DE); Bernd Woltermann, Ulm (DE)

(73) Assignee: DaimlerChrysler AG, Ulm (DE)

( * ) Notice: Subject to any disclaimer, the term of this patent is extended or adjusted under 35 U.S.C. 154(b) by 186 days.

(21) Appl. No.: 09/862,947

(22) Filed: May 22, 2001

(65) Prior Publication Data

US 2001/0045981 A1 Nov. 29, 2001

(30) Foreign Application Priority Data

May 24, 2000 (DE) ......................................... 100 25 678

(51) Int. Cl.$^7$ ................................................ B60Q 1/00
(52) U.S. Cl. ..................... 340/435; 340/436; 340/937; 382/106; 382/224
(58) Field of Search ................................ 340/435, 436, 340/903, 937, 928; 382/104, 107, 224; 348/148, 171, 149, 162–164, 135, 140, 142, 143, 150, 169, 159

(56) References Cited

U.S. PATENT DOCUMENTS

| 5,410,346 A | | 4/1995 | Saneyoshi et al. | 348/116 |
|---|---|---|---|---|
| 5,424,952 A | * | 6/1995 | Asayama | 701/200 |
| 5,541,590 A | * | 7/1996 | Nishio | 340/903 |
| 5,555,312 A | * | 9/1996 | Shima et al. | 382/104 |
| 5,617,085 A | * | 4/1997 | Tsutsumi et al. | 340/903 |
| 5,699,149 A | | 12/1997 | Kuroda et al. | 356/4.01 |
| 5,761,326 A | * | 6/1998 | Brady et al. | 382/103 |
| 6,035,053 A | * | 3/2000 | Yoshioka et al. | 382/104 |
| 6,134,497 A | * | 10/2000 | Hayashi et al. | 701/70 |
| 6,191,704 B1 | | 2/2001 | Takenaga et al. | 340/903 |
| 6,292,752 B1 | * | 9/2001 | Franke et al. | 701/300 |
| 6,362,773 B1 | * | 3/2002 | Pochmuller | 342/52 |
| 6,424,272 B1 | * | 7/2002 | Gutta et al. | 340/937 |
| 6,424,273 B1 | * | 7/2002 | Gutta et al. | 340/937 |

FOREIGN PATENT DOCUMENTS

| DE | 19648826 | 6/1997 |
|---|---|---|
| DE | 19601831 | 7/1997 |
| DE | 4308776 | 8/1997 |
| DE | 19623365 | 12/1997 |
| DE | 19802261 | 7/1999 |
| DE | 19818586 | 9/1999 |
| DE | 19842827 | 3/2000 |
| DE | 19831413 | 4/2000 |
| EP | 0820040 | 1/1998 |
| EP | 973121 | 1/2000 |
| WO | 0161669 | 8/2001 |

* cited by examiner

Primary Examiner—Daniel Wu
Assistant Examiner—Son Tang
(74) Attorney, Agent, or Firm—Davidson, Davidson & Kappel, LLC

(57) ABSTRACT

A method and a device for detecting road users and obstacles on the basis of camera images, in order to determine their distance from the observer and to classify them. In a two-step classification, potential other parties involved in a collision are detected and identified. In so doing, in a first step, potential other parties involved in a collision are marked in the image data of a mono-image camera; their distance and relative velocity are subsequently determined so that endangering objects can be selectively subjected to a type classification in real time. By breaking down the detection activity into a plurality of steps, the real-time capability of the system is also rendered possible using conventional sensors already present in the vehicle.

19 Claims, 1 Drawing Sheet

CAMERA-BASED PRECRASH DETECTION SYSTEM

BACKGROUND OF THE INVENTION

The present invention is directed to a method for detecting road users and obstacles on the basis of camera images, and to a device for detecting road users and obstacles on the basis of camera images.

By detecting an imminent collision between a road user and the vehicle of an observer at an early stage, one can improve the safety of vehicle occupants as well as of the potential other party involved in the collision. The time savings that can be gained by visually detecting and evaluating the observable region in front of the observer's vehicle permits stepped reactions of the vehicle occupant safety systems (e.g., a gentle firing of the airbag), or makes reactions possible in the first place to protect the other party in a collision (such as raising the engine hood in the case of collision involving a pedestrian). Developments culminating in switchable crash structures have made it more important than ever to know the type of other party involved in the accident (truck, passenger car, motor cycle, pedestrian).

Current developments in precrash sensors are directed, inter alia, to the analysis of methods based on infrared lasers, ultrasound, or radar sensors. The drawbacks of these systems are due, in part, to their limited range (ultrasound, infrared laser) and to their inability to identify the other party potentially involved in a collision, along the lines of a reliable type classification (truck, passenger car, motor cycle, person). In radar-based systems, inter alia, non-metallic objects (e.g.: people or trees) are not able to be reliably detected by inexpensive sensors suited for use in vehicle applications. However, adapting an optimally stepped reaction of safety systems to imminent collisions requires reliable detection and dependable typing. Within the framework of such a stepped reaction, for example in the event of a collision with a pedestrian, active measures should be taken to ensure the pedestrian's safety. In this connection, one can conceive of rapid changes in the vehicle body form to minimize the probability of serious head or leg injuries. However, the basic condition for activating these measures is that the safety system be able to reliably detect road users and classify them according to type (e.g.: passenger car, truck, bicycle riders, pedestrians).

Generally, methods for interpreting image scenes endeavor to not only obtain purely two-dimensional image information, but multi-dimensional scene information as well. They do so already in the first step, using a mostly costly sensor (stereo sensor or high-resolution radar or lidar). In order to detect objects, these methods are based, however, on models, above all with respect to the position and orientation of potential targets, as well as with respect to a predefined, fixed geometry of the orientation to the sensor and surroundings. In practice, it is often ascertained, however, that these models and assumptions frequently do not conform with actual conditions, so that misinterpretations result.

SUMMARY OF THE INVENTION

An object of the present invention is to devise a method and a suitable device which will make it possible to detect road users on the basis of camera images, to determine their distance from the observer, and to classify the road users.

The present invention provides a method for detecting road users and obstacles on the basis of camera images, in order to determine their distance from the observer and to classify them, wherein a classifier designed for detecting road users and obstacles identifies regions within a two-dimensional camera image that is not resolved with respect to distance. In a subsequent step, these regions, so identified, are marked and then ranged using a distance-measuring sensor with respect to their distance from the observer. Selected regions are subsequently fed to a type classification to identify the road users or obstacles. In this case, the recording of data, organized into a plurality of steps, and object identification facilitate the use of conventional sensory technology and, at the same time, offer the potential of a real-time implementation.

The present invention also provides a device for detecting road users and obstacles on the basis of camera images, to determine their distance from the observer, and to classify them, wherein a mono-image camera 1 is coupled to a distance-measuring sensor unit 3. In each case, this coupling has an interposed or downstream classifying unit 2 and 5, respectively.

The method according to the present invention identifies regions within a camera image, in which road users or obstacles are situated. It advantageously suffices, in this context, that this camera image contains purely two-dimensional image information without any distance resolution. The identification is carried out using a classifier specially trained for the road users and obstacles to be detected. In a subsequent step, the regions so identified are then marked and ranged using a distance-measuring sensor with respect to their distance from the observer. Selected regions are subsequently fed to a type classification to precisely determine the type of road user or obstacle.

A device suited for implementing this method includes a mono-image camera, which is coupled to a distance-measuring sensor unit. In each case, this coupling has an interposed or downstream classifying unit.

In one advantageous embodiment of the device, the downstream classifying unit used for classifying types has an upstream selection unit connected in incoming circuit thereto, with whose assistance the number of regions to be classified can be controlled.

DETAILED DESCRIPTION

Figure 1:
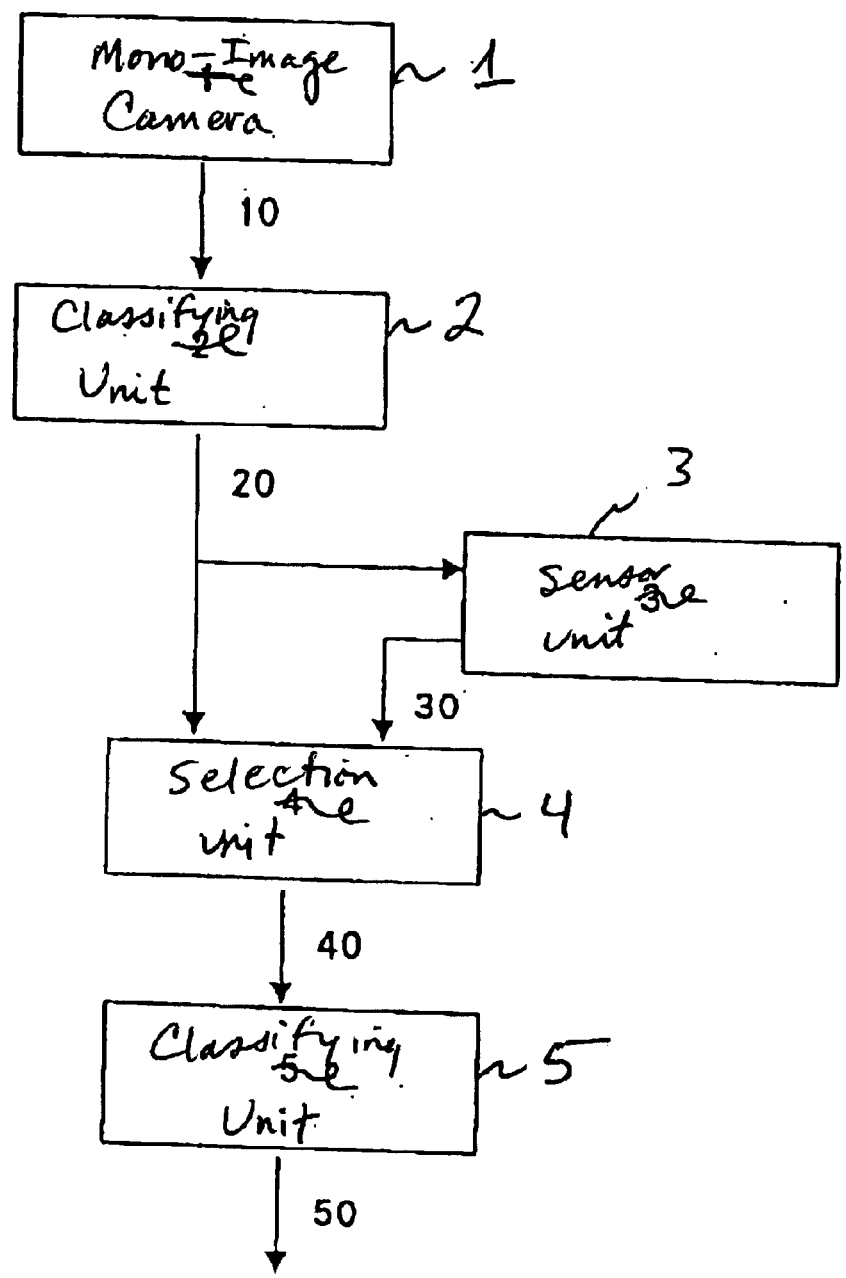
FIG. 1 schematically depicts one advantageous refinement of a device for implementing the method of the present invention.

FIG. 1 schematically depicts one advantageous refinement of such a device for implementing the method of the present invention. Here, mono-image camera 1 makes image data 10 available to a classifying unit 2, which identifies image regions containing the road users or obstacles and informs distance-measuring sensor unit 3 of the corresponding positional data. Sensor unit 3 then measures these regions with respect to their distance from the observer. In so doing, these measuring data 30, together with data 20 from first classifying unit 2, are available to a selection unit 4. Selection unit 4 can control the data flow to the downstream unit for classifying selected road users or obstacles 5 by type. Image data 40 selected by the selection unit are transmitted to classifying unit 5 for classification. Results 50 of this type classification are advantageously made available to a risk calculator connected to the classifying unit, so that the risk calculator can decide whether to initiate reactions that meet the requirements of the situation.

It is also conceivable, in another advantageous embodiment of the device according to the present invention, for selection unit 4 to be omitted and, basically, for all data 20 and 30 to be fed directly to classifying unit 5.

The method according to the present invention can be devised quite advantageously to identify road users and obstacles through the use of a hyperpermutation network within the framework of classifying unit 2.

A network of this kind is able to localize regions belonging to a specific class (in this case road users and obstacles), at a high speed and on the basis of pixels, within image data 10. The advantage of using simple, two-dimensional image information is not only apparent in the method's suitability for using a simple, inexpensive camera, but, in particular, also in the feasibility of using powerful classification algorithms under real-time conditions to analyze the entire image information. Since image information 10 supplied by a mono-image camera 1 is quite simple, it is possible, in contrast to conventional methods that mostly work on very complex data, to include every single image pixel in the classification.

Within classifying unit 2, an algorithm, advantageously a box (boxcar-averaging) algorithm adapted to this task follows the actual classifier (for example the hyperpermutation network). This box algorithm combines and marks related regions of interest ROI, so that they can be fed for further processing.

Within the framework of this further processing, the regions belonging to this ROI are marked and ranged using a distance-measuring sensor 3, with respect to their distance from the observer. Radar systems or stereo camera systems are advantageously suited for this. Since the data acquired by these sensors are utilized purely for estimating distances and not for classifying types of road users or obstacles, there is no need to equip these sensors with extreme angular resolutions or with robust models requiring substantial computational outlay. Thus, one can preferably revert to using sensors which are already present in the vehicle and mainly geared towards other applications.

It is also conceivable, however, in another advantageous embodiment of the method according to the present invention, for distances to be estimated in the area of the ROI using a mono-image camera, in cooperation with a complex image analysis. Since, in this connection, only individual segments (ROI) of the entire image information need to be processed, large-volume computational work can be performed in real time using powerful processors. It would be especially beneficial, in this context, if this information could be directly obtained in a second processing step from image data 10 already supplied by mono-image camera 1. The system can also be implemented without the use of an additional distance-measuring sensor 3.

In the method of the present invention, the information obtained by repeatedly measuring the distance of road users or obstacles from the user is advantageously used to determine the relative velocity of these objects in relation to the observer. It is of particular benefit for distance-measuring sensor 3 to not only provide distance information, but velocity information as well (e.g.: double radar). This would enable the indirect velocity estimation to be omitted from the sequence of distance measurements.

The distance and velocity information 30 is fed, together with image information 10, to a selection unit 4. Based on its default settings, this selection unit then decides which of the image data are to be supplied to a type classification within a downstream classifying unit 5. One can conceive of selection unit 4 being configured to basically supply all image data belonging to ROI to a type classification. However, one can also conceive of only those image data being transmitted which belong to the ROI having assigned road users or obstacles which meet specific criteria. In the process, the existing potential for danger is to be considered; thus, for example, the size of objects or the velocity at which they move toward the observer, or also their relative velocity in general (for example, moving or stationary objects).

For the actual type classification within classifying unit 5 which serves the purpose of precisely defining the type of road user or obstacle, one can fall back on classification algorithms specially trained for such objects. Advantageously suited for this are neural networks, such as a radial-basis function classifier or a support-vector machine.

The method and device of the present invention are superbly suited for the early detection and subsequent assessment of accident situations (precrash detection).

What is claimed is:

1. A method for detecting road users and obstacles as a function of camera images so as to determine their distance from an observer and to classify them, comprising the steps of:
   identifying regions within a two-dimensional camera image that is not resolved with respect to distance using a classifier designed for detecting road users and obstacles;
   marking and ranging, in a subsequent step, the identified regions using a distance-measuring sensor with respect to their distance from the observer; and
   subsequently type classifying the identified regions using a type classifier.

2. The method as recited in claim 1 wherein the camera image contains only two-dimensional image information without any distance resolution.

3. The method as recited in claim 1 wherein information obtained the marking and ranging step is used to determine a relative velocity of the individual road users or obstacles.

4. The method as recited in claim 1 wherein the classifier designed for recognizing road users is a hyperpermutation network.

5. The method as recited in claim 1 wherein a box algorithm is used to mark regions identified as road users.

6. The method as recited in claim 1 wherein the distance-measuring sensor is a radar sensor.

7. The method as recited in claim 1 wherein the distance-measuring sensor is a stereo-camera system.

8. The method as recited in claim 1 wherein the distance-measuring sensor is a mono-camera system, which, by using suitable image processing, is able to make distance estimates.

9. The method as recited in claim 8 wherein the mono-camera system is used in the identifying step to generate the two-dimensional camera image.

10. The method as recited in claim 1 wherein the type classifier is a radial-basis function classifier.

11. The method as recited in claim 1 wherein the type classifier is a support vector machine.

12. The method as recited in claim 1 wherein the regions to be subjected to a type classification are selected as a function of at least one of distance and relative velocity in relation to the observer.

13. The method as recited in claim 1 wherein the selection of the regions to be subjected to a type classification includes all regions identified as road users or obstacles.

14. The method as recited in claim 1 wherein the result of the type classification is transmitted to a risk calculator to decide on reactions to be possibly initiated.

15. The method as recited in claim 1 further comprising using the method for early detection of accident situations.

16. A device for detecting road users and obstacles as a function of camera images to determine their distance from an observer, and to classify them, comprising:

a distance-measuring sensor unit;

a mono-image camera coupled to the distance-measuring sensor unit;

a first classifying unit interposed between the sensor unit and the camera; and a second classifying unit downstream from the sensor unit and the camera.

17. The device as recited in claim 16 further comprising a selection unit and wherein the mono-image camera is linked to the first classifying unit, the first classifying unit containing a module for identifying image regions to be assigned to road users and obstacles, and marking these regions and making available corresponding data at an output of the module for a further processing; and coupled to the output of the module is the distance-measuring sensor unit, which is able to measure the marked regions with respect to their distance from the observer, and which makes available these measured data via a connection to the selection unit, via which the second classifying unit is linked and classifies the regions supplied to it by the selection unit with respect to type of road user or obstacle.

18. The device as recited in claim 16 further comprising a risk calculator is connected to the output of the second classifying unit.

19. The device as recited in claim 16 wherein the device is located in a vehicle and used for early detection of accident situations.

* * * * *